US012631457B2

(12) United States Patent
Stasiowski et al.

(10) Patent No.: US 12,631,457 B2
(45) Date of Patent: May 19, 2026

(54) SYSTEMS AND METHODS FOR DISPATCHING AND NAVIGATING AN UNMANNED AERIAL VEHICLE

(71) Applicant: Safe Ops Systems, Inc., Larkspur, CA (US)

(72) Inventors: Donald Frederick Stasiowski, Sebastopol, CA (US); Shaman Ajmani, Larkspur, CA (US)

(73) Assignee: Safe Ops Systems, Inc., Larkspur, CA (US)

( * ) Notice: Subject to any disclaimer, the term of this patent is extended or adjusted under 35 U.S.C. 154(b) by 195 days.

(21) Appl. No.: 18/256,712

(22) PCT Filed: Dec. 17, 2021

(86) PCT No.: PCT/US2021/064219
§ 371 (c)(1),
(2) Date: Jun. 9, 2023

(87) PCT Pub. No.: WO2022/133322
PCT Pub. Date: Jun. 23, 2022

(65) Prior Publication Data
US 2024/0044651 A1     Feb. 8, 2024

Related U.S. Application Data

(60) Provisional application No. 63/127,469, filed on Dec. 18, 2020.

(51) Int. Cl.
*G01C 21/20* (2006.01)
*G05D 1/00* (2006.01)
(Continued)

(52) U.S. Cl.
CPC ............. *G01C 21/20* (2013.01); *G05D 1/101* (2013.01); *B64U 10/00* (2023.01); *B64U 2101/55* (2023.01); *B64U 2201/10* (2023.01)

(58) Field of Classification Search
None
See application file for complete search history.

(56) References Cited

U.S. PATENT DOCUMENTS 9,713,675 B2    7/2017  Levien et al.
11,017,679 B2    5/2021  Moster et al.
(Continued)

FOREIGN PATENT DOCUMENTS

CN        107531322 A     1/2018
CN        107608371 A     1/2018
(Continued)

OTHER PUBLICATIONS

International Search Report dated Mar. 8, 2022 re PCT/US21/64219 (3 pages).
(Continued)

*Primary Examiner* — Christian Chace
*Assistant Examiner* — Ai K Tran
(74) *Attorney, Agent, or Firm* — Aurora Consulting LLC; Albert Du; Ashley Sloat

(57) ABSTRACT

A system for dispatching and navigating an unmanned aerial vehicle (UAV) to a target location comprises a UAV and a navigation module comprising a processor and a memory storing a 3D map comprising the target location and machine-readable instructions such that, when executed by the navigation module processor, cause the processor to perform a method comprising identifying a location of the UAV with respect to the 3D map, receiving a target location input, identifying the target location with respect to the 3D map, generating at least one potential route connecting the location of the UAV and the target location, assigning to at least one potential route an evaluation score according to at least one route assessment criterion, selecting the potential
(Continued)

100 route having the highest evaluation score as a preferred route, and transmitting the preferred route to the UAV.

20 Claims, 6 Drawing Sheets

(51) Int. Cl.
  *B64U 10/00* (2023.01)
  *B64U 101/55* (2023.01)

(56) References Cited

U.S. PATENT DOCUMENTS

| | | | |
|---|---|---|---|
| 2016/0140851 A1 | 5/2016 | Levy et al. | |
| 2017/0261999 A1 | 9/2017 | Voorst | |
| 2018/0061251 A1 | 3/2018 | Venkatraman et al. | |
| 2019/0196507 A1 | 6/2019 | Zhang et al. | |
| 2019/0251851 A1 | 8/2019 | Zhao et al. | |
| 2019/0265705 A1* | 8/2019 | Zhang ................... | G05D 1/644 |
| 2019/0277635 A1 | 9/2019 | Weisbrod et al. | |
| 2019/0332114 A1 | 10/2019 | Moroniti et al. | |
| 2020/0043350 A1 | 2/2020 | Cantrell et al. | |
| 2020/0117201 A1 | 4/2020 | Oetken et al. | |
| 2020/0160733 A1 | 5/2020 | Dick et al. | |
| 2020/0273353 A1 | 8/2020 | O'Connell et al. | |
| 2020/0293045 A1* | 9/2020 | Ghiglino Novoa .. | G05D 1/0094 |
| 2021/0358315 A1 | 11/2021 | Moster et al. | |

FOREIGN PATENT DOCUMENTS

| | | |
|---|---|---|
| CN | 107922050 A | 4/2018 |
| CN | 109643498 A | 4/2019 |
| CN | 110121740 A | 8/2019 |
| CN | 110888453 A | 3/2020 |
| WO | 2019122842 A1 | 6/2019 |
| WO | 2020013153 A1 | 1/2020 |
| WO | 2020142548 A1 | 7/2020 |

OTHER PUBLICATIONS

Written Opinion dated Mar. 8, 2022 re PCT/US21/64219 (15 pages).

Extended European Search Report re EP Application No. 21907964.7 dated Sep. 23, 2024 (10 pages).

International Preliminary Report on Patentability dated Jun. 29, 2023 re PCT/US2021/064219 (17 pages).

China Search Report re 202180084470.9 dated Nov. 14, 2025.

\* cited by examiner

100

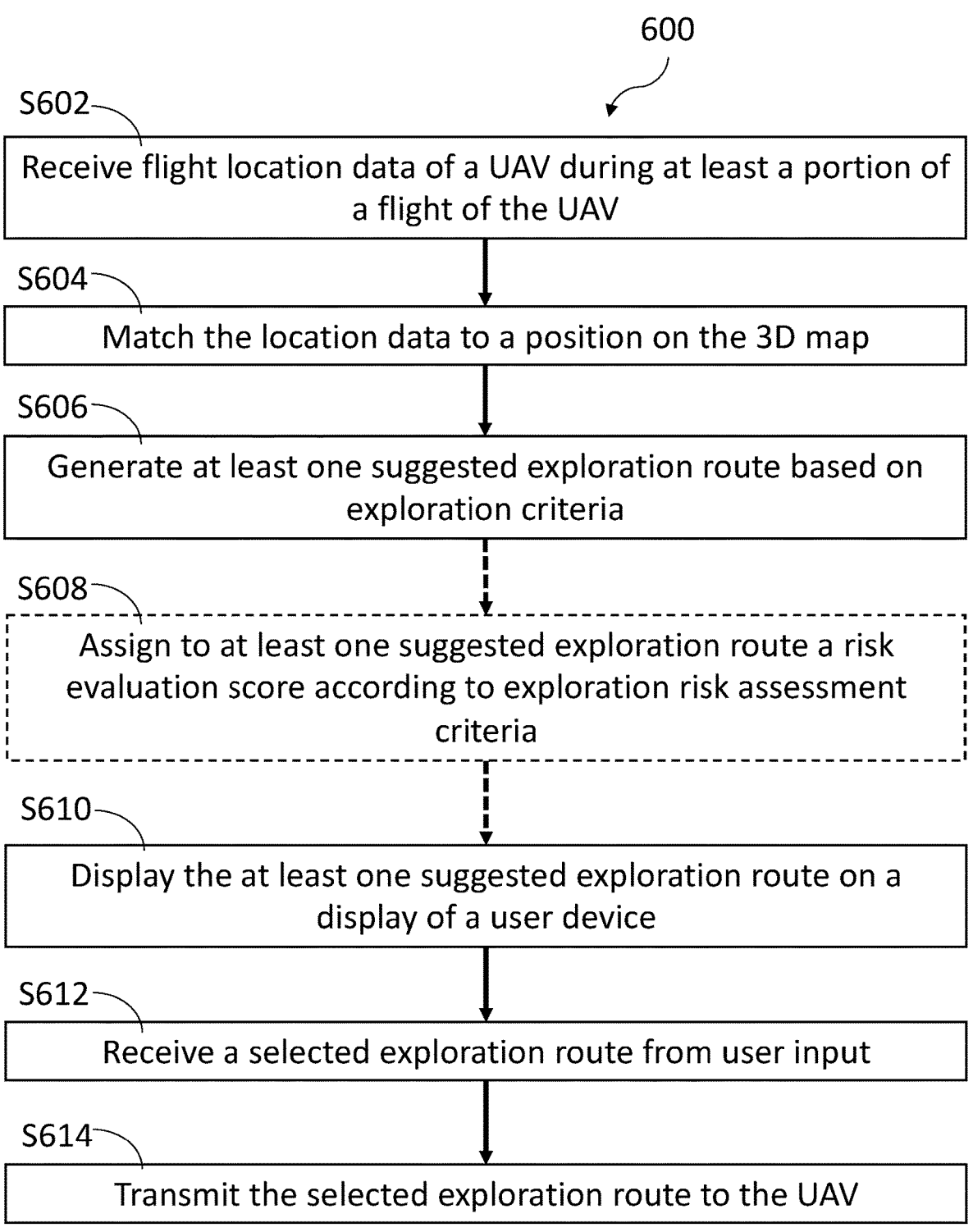

600

S602
Receive flight location data of a UAV during at least a portion of a flight of the UAV S604
Match the location data to a position on the 3D map S606
Generate at least one suggested exploration route based on exploration criteria S608
Assign to at least one suggested exploration route a risk evaluation score according to exploration risk assessment criteria S610
Display the at least one suggested exploration route on a display of a user device S612
Receive a selected exploration route from user input S614
Transmit the selected exploration route to the UAV

FIG. 6

SYSTEMS AND METHODS FOR DISPATCHING AND NAVIGATING AN UNMANNED AERIAL VEHICLE

CROSS-REFERENCE TO RELATED APPLICATION

This application is a 35 U.S.C. 371 National Stage filing for PCT Application Ser. No. PCT/US2021/064219, filed Dec. 17, 2021, which claims the priority benefit of U.S. Provisional Patent Application Ser. No. 63/127,469, filed on Dec. 18, 2020, the contents of each of which are herein incorporated by reference in their entireties.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of navigation and control systems, and more specifically to the field of autonomous navigation of unmanned aerial vehicles (UAVs). Described herein are systems and methods for dispatching and navigating a UAV.

BACKGROUND

Unmanned aerial vehicles (UAVs), commonly known as "drones," have the potential to be a powerful tool for disaster and emergency response teams. When fitted with a camera or other sensors, UAVs offer a relatively affordable and expedient means to acquire information regarding an ongoing disaster or emergency without endangering a human actor or more expensive equipment. However, the difficulty of deploying and navigating a UAV prevent their widespread adoption for this role.

Flying a UAV is no simple task. It can require hours of training in order to properly educate a professional to handle a UAVs' high maneuverability but also vulnerability to wind and weather conditions. Furthermore, in many locales, especially in residential areas, various legislation prohibits the entry of UAVs into certain airspaces for either safety (e.g., airports) or privacy concerns. A pilot of a UAV must therefore be additionally versed in which areas he or she may navigate the drone. Finally, during an emergency response operation that seeks to employ a manually operated UAV, one member of the team must remain fully committed to piloting the drone during its flight time. In certain jurisdictions, such as rural areas, the response team may not have the personnel to spare to that narrow of an activity.

Pre-existing automated UAVs suffer from similar problems. Some UAVs are capable of maintaining a constant altitude in gentle weather conditions but will struggle under intense weather conditions or in areas where the terrain exhibits rapid changes in elevation or sudden, sharp obstacles, such as very hilly or mountainous regions or those that feature isolated but large groups of trees. UAVs of these types have an immense risk of crashing into stationary objects, like the aforementioned hillsides and trees. Outfitting a drone with complicated digital vision systems to avoid these hazards dramatically increases the cost of the UAV, thus discouraging response teams to take the adequate risks with the UAV that may be necessary during an emergency response situation due to the fear of damaging or destroying the drone.

Therefore, there is a need for a new, useful, and cost-effective system for dispatching and navigating a UAV that overcomes at least these above-described limitations.

SUMMARY

One aspect of the disclosure herein includes for, in some embodiments, a system for dispatching and navigating an unmanned aerial vehicle (UAV) to a target location comprising: a UAV; and a navigation module in communication with the UAV, the navigation module comprising: a navigation module processor; and a navigation module memory storing a 3D map comprising the target location and machine-readable instructions such that, when executed by the navigation module processor, cause the processor to perform a method comprising: identifying a location of the UAV with respect to the 3D map; receiving a target location input; identifying the target location with respect to the 3D map; generating at least one potential route connecting the location of the UAV and the target location; assigning to at least one potential route an evaluation score according to at least one route assessment criterion; selecting the potential route having the highest evaluation score as a preferred route; and transmitting the preferred route to the UAV; and wherein the UAV comprises a UAV memory and at least one of a UAV processor or a UAV microcontroller in communication with the UAV memory, the UAV memory storing machine-readable instructions such that, when executed by the UAV processor or UAV microcontroller, cause the UAV processor or UAV microcontroller to perform a method comprising: receiving a preferred route from the navigation module; and activating propulsion means of the UAV to maneuver the UAV according to the preferred route.

In some embodiments, the system further comprises a user device in communication with the navigation module and the UAV. In further embodiments, the user device transmits the target location input to the navigation module after receiving a user input. In some embodiments, the UAV further comprises at least one scouting sensor, and wherein the machine-readable instructions stored on the UAV memory, further instruct the UAV processor or UAV microcontroller to: acquire sensor data from the at least one scouting sensor and transmit at least a portion of the sensor data to the user device. In further embodiments, the at least one scouting sensor is selected from the group consisting of a camera, an infrared camera, a microphone, an acoustic sensor, a LiDAR sensor, an ultrasound, a sonar, a radar, a gyroscope, an electrochemical toxic gas sensor, a thermometer, a humidity sensor, a proximity sensor, a barometric air pressure sensor, a radiation sensor, or a combination thereof.

In some embodiments, the UAV and the navigation module are in communication by at least one of: cellular, Wi-Fi, radio frequency, infrared frequency, optical systems, laser systems, or satellite networks. In other embodiments, the UAV and the navigation module are in communication by at least two of: cellular, Wi-Fi, radio frequency, infrared frequency, optical systems, laser systems, or satellite networks. In some embodiments, the UAV, the navigation module, and user device are in communication by at least one of: cellular, Wi-Fi, radio frequency, infrared frequency, optical systems, laser systems, or satellite networks. In other embodiments, the UAV, the navigation module, and user device are in communication by at least two of: cellular, WiFi, radio frequency, infrared frequency, optical systems, laser systems, or satellite networks.

In some embodiments, the 3D map comprises at least one of LiDAR data or photogrammetric calculations. In other embodiments, the 3D map further comprises zone indicator tags comprising at least one of: geofenced no-fly zones, drop-off or landing zones, collision risk indicators, weather risk indicators, environment risk indicators, or a combination thereof.

In some embodiments, the navigation module is physically attached to the UAV. In other embodiments, the navigation module is electronically integrated into and in circuit communication with the UAV. In further embodiments, the navigation module is physically separate from the UAV. In other embodiments, the navigation module is one or more computing devices on a cloud network system. In still further embodiments, the navigation module is a virtual machine. In still further embodiments, the user device comprises the navigation module. In still additional embodiments, the user device is a virtual machine.

In some embodiments, the plurality of potential routes is generated according to at least one route constraint criterion comprising at least one of: a collision safety buffer, a total route distance or time, a maximum altitude, at least one geofenced no-fly zone, a remaining battery life of the UAV, or a combination thereof. In some embodiments, the at least one route assessment criterion comprises at least one of: a total route distance or time, a minimum altitude change, a maximum altitude, a duration of travel time spent above a predetermined altitude threshold, collision risk indicators, weather risk indicators, environment risk indicators, or a combination thereof. In other embodiments, assigning to at least one potential route an evaluation score according to at least one route assessment criterion further comprises analyzing at least one route assessment criterion with an artificial intelligence or machine learning technique.

In some embodiments, the machine-readable instructions stored on the navigation module, further instruct the navigation module processor to: receive at least one of updated 3D map data, geofenced no-fly zones, drop-off or landing zones, collision risk indicators, weather risk indicators, or environment risk indicators; and store the at least one of updated 3D map data, geofenced no-fly zones, drop-off or landing zones, collision risk indicators, weather risk indicators, and environment risk indicators to the memory of the navigation module. In some embodiments, the navigation module processor identifies the location of the UAV with respect to the 3D map via global coordinate data.

In some embodiments, the machine-readable instructions stored on the navigation module memory further instruct the navigation module processor to: receive flight location data of the UAV during at least a portion of flight of the UAV along the preferred route; compare the flight location data to the preferred route to identify whether a route deviation has occurred; when the route deviation has been identified, calculate a corrected route connecting the location of the UAV to the target location; and transmit the corrected route to the UAV; and wherein the machine-readable instructions stored on the UAV memory further instruct the UAV processor or UAV microcontroller to: receive the corrected route from the navigation module; and activate propulsion means to maneuver the UAV according to the corrected route. In some embodiments, the corrected route is calculated according to at least one route constraint criterion comprising at least one of: a collision safety buffer, a total route distance or time, a maximum altitude, at least one geofenced no-fly zone, a remaining battery life of the UAV, or a combination thereof. In other embodiments, the corrected route is calculated by analyzing at least one route constraint criterion with an artificial intelligence or machine learning technique. In some embodiments, the flight location data comprises global coordinate data.

In some embodiments, the machine-readable instructions stored on the navigation module memory further instruct the navigation module processor to: receive flight location data from the UAV during at least a portion of flight of the UAV; match the location data to a position on the 3D map; generate at least one suggested exploration route based on at least one exploration criterion comprising at least one of: a predicted scouting sensor detection improvement, a collision safety buffer, a total route distance or time, a maximum altitude, or a combination thereof; display the at least one suggested exploration route on a display of the user device; receive a selected exploration route from user input; and transmit the selected exploration route to the UAV; and wherein the machine-readable instructions stored on the UAV memory further instruct the UAV processor or UAV microcontroller to: receive the selected exploration route from the navigation module; and activate propulsion means of the UAV to maneuver the UAV according to the selected exploration route. In some embodiments, the at least one suggested exploration route is further based on at least one route constraint criterion comprising at least one of: a collision safety buffer, a total route distance or time, a maximum altitude, at least one geofenced no-fly zone, a remaining battery life of the UAV, or a combination thereof. In some embodiments, the flight location data comprises global coordinate data.

In some embodiments, the machine-readable instructions stored on the navigation module memory further instruct the navigation module processor to: assign to at least one suggested exploration route a risk evaluation score according to at least one exploration risk assessment criterion comprising at least one of: a minimum altitude change, a maximum altitude, a duration of travel time spent above a predetermined altitude threshold, collision risk indicators, weather risk indicators, environment risk indicators, or a combination thereof; and display the corresponding risk evaluation score for each suggested exploration route on the display of the user device. In other embodiments, assigning to at least one suggested exploration route a risk evaluation score further comprises analyzing at least one exploration risk assessment criterion with an artificial intelligence or machine learning technique. In some embodiments, the machine-readable instructions stored on the navigation module memory further instruct the navigation module processor to: identify whether at least one suggested exploration route fails to meet a predetermined risk evaluation score threshold; and when an identification has been made, delete the at least one suggested exploration route that failed to meet a predetermined risk evaluation score. In further embodiments, the machine-readable instructions stored on the UAV memory, further instruct the UAV processor or UAV microcontroller to: receive a manual override command from the user device; and maneuver the UAV according to manual maneuver inputs.

Another aspect of the disclosure herein includes for, in some embodiments, a computer-implemented method for dispatching and navigating an unmanned aerial vehicle (UAV) to a target location, the method comprising: identifying a location of a UAV with respect to a 3D map; receiving a target location input; identifying the target location with respect to the 3D map; generating at least one potential route connecting the location of the UAV and the target location; assigning to at least one potential route an evaluation score according to at least one route assessment criterion; selecting the potential route having the highest evaluation score as a preferred route; and transmitting the preferred route to the UAV.

In some embodiments of the method, the 3D map comprises at least one of LiDAR data or photogrammetric calculations. In other embodiments, the 3D map further comprises zone indicator tags comprising at least one of: geofenced no-fly zones, drop-off zones, landing zones, collision risk indicators, weather risk indicators, environment risk indicators, or a combination thereof.

In some embodiments of the method, the plurality of potential routes is generated according to at least one route constraint criterion comprising at least one of: a collision safety buffer, a total route distance or time, a maximum altitude, at least one geofenced no-fly zone, a remaining battery life of the UAV, or a combination thereof. In some embodiments, the at least one route assessment criterion comprises at least one of: a total route distance or time, a minimum altitude change, a maximum altitude, a duration of travel time spent above a predetermined altitude threshold, collision risk indicators, weather risk indicators, environment risk indicators, or a combination thereof. In other embodiments, assigning to at least one potential route an evaluation score according to route assessment criteria further comprises analyzing at least one route assessment criterion with an artificial intelligence or machine learning technique. In some embodiments, the location of the UAV is identified with respect to the 3D map via global coordinate data.

In some embodiments, the method further comprises: receiving flight location data of the UAV during at least a portion of flight of the UAV along the preferred route; comparing the flight location data to the preferred route to identify whether a route deviation has occurred; when the route deviation has been identified, calculating a corrected route connecting the location of the UAV to the target location; and transmitting the corrected route to the UAV. In some embodiments, the corrected route is calculated according to at least one route constraint criterion comprising at least one of: a collision safety buffer, a total route distance or time, a maximum altitude, at least one geofenced no-fly zone, a remaining battery life of the UAV, or a combination thereof. In some embodiments, the flight location data comprises global coordinate data. In other embodiments, the corrected route is calculated by analyzing at least one route constraint criterion with an artificial intelligence or machine learning technique.

In some embodiments, the method further comprises: receiving flight location data from the UAV during at least a portion of flight of the UAV; matching the location data to a position on the 3D map; generating at least one suggested exploration route based on at least one exploration criterion comprising at least one of: a predicted scouting sensor detection improvement, a collision safety buffer, a total route distance or time, a maximum altitude, or a combination thereof; displaying the at least one suggested exploration route on a display of a user device; receiving a selected exploration route from user input; and transmitting the selected exploration route to the UAV. In some embodiments, the at least one suggested exploration route is further based on at least one route constraint criterion comprising at least one of: a collision safety buffer, a total route distance or time, a maximum altitude, at least one geofenced no-fly zone, a remaining battery life of the UAV, or a combination thereof. In some embodiments, the flight location data comprises global coordinate data.

In some embodiments, the method further comprises: assigning to at least one suggested exploration route a risk evaluation score according to at least one exploration risk assessment criterion comprising at least one of: a minimum altitude change, a maximum altitude, a duration of travel time spent above a predetermined altitude threshold, collision risk indicators, weather risk indicators, environment risk indicators, or a combination thereof; and displaying the corresponding risk evaluation score for each suggested exploration route on the display of the user device. In other embodiments, assigning to at least one suggested exploration route a risk evaluation score further comprises analyzing at least one exploration risk assessment criterion with an artificial intelligence or machine learning technique.

In some embodiments, the method further comprises: identifying whether at least one suggested exploration route fails to meet a predetermined risk evaluation score threshold; and when an identification has been made, deleting the at least one suggested exploration route that failed to meet a predetermined risk evaluation score.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

FIG. 6 illustrates a method for monitoring the position of a UAV in flight, generating and suggesting exploration maneuvers to a user, and executing upon the selected maneuvers.

Figure 1:
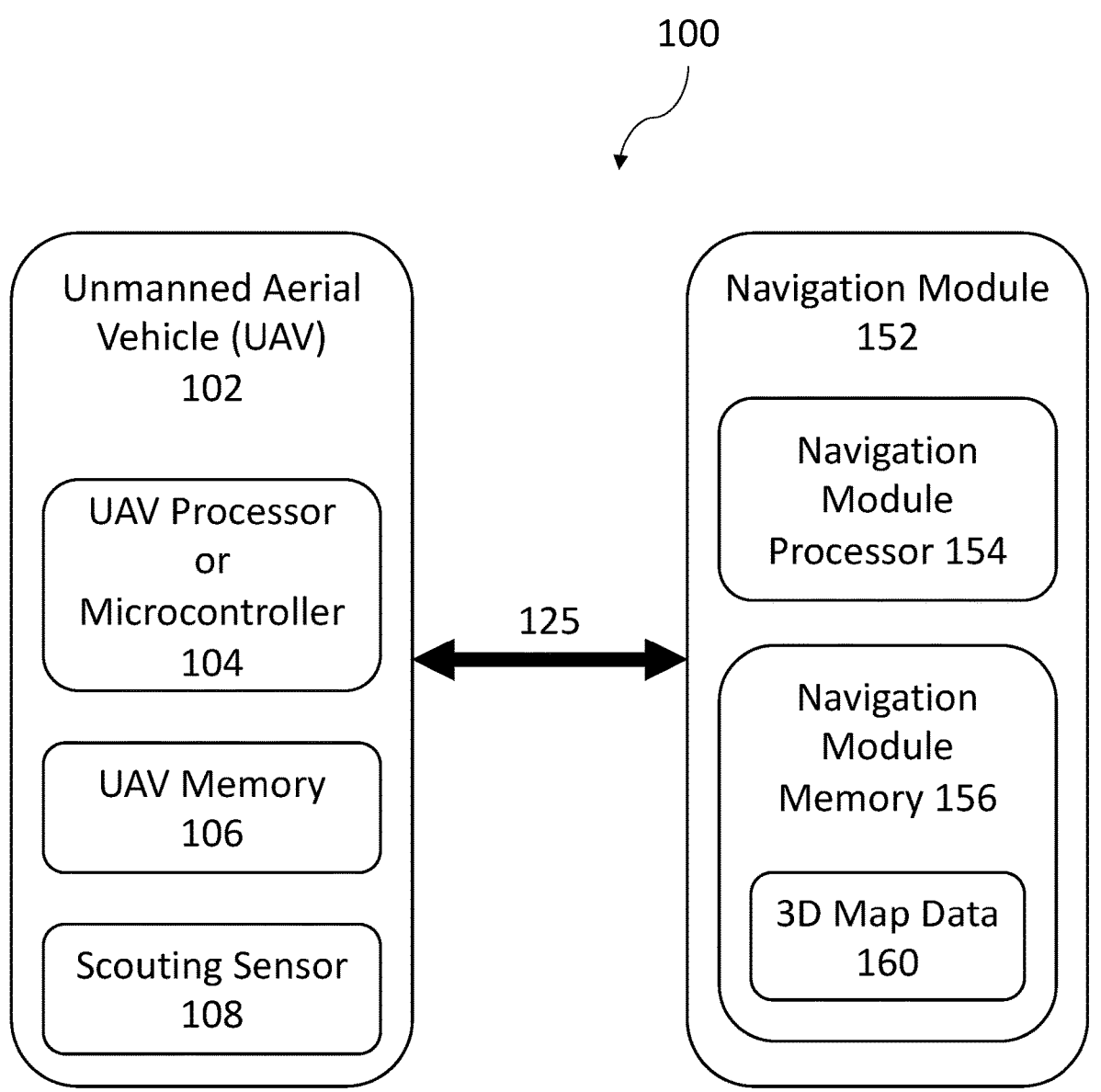
FIG. 1 illustrates a block diagram of various components of one embodiment of the system.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Disclosed herein are systems and methods for dispatching and navigating a UAV. In many embodiments, the system and methods allow for the semiautonomous navigation of a UAV to a target location of interest, such as one where a disaster or emergency is occurring (e.g., a wildfire, a building fire, a flood, etc.) with greater ease of use than that of current systems. Utilizing a navigation module storing at least three-dimensional (3D) map data in many embodiments, the systems and methods allow for a much more "hands-off" approach to dispatching and navigating a UAV while still avoiding obvious crash hazards and other flight limitations as well as enabling and assisting a user to input explorative and alternative flight maneuvers. In some embodiments, the UAV used can be a commercially available drone modified with specific hardware. In other embodiments, the UAV can be custom built to perform the features described herein.

As discussed herein, the system and methods can be used for emergency and disaster response, but they can be additionally or alternatively used for any suitable application where the semiautonomous navigation of a UAV is desired, such as in aerial photography, delivery services, and recreational or military purposes. As used herein, the terms "UAV" and "drone" will be considered synonymous and can be used interchangeably throughout.

In many embodiments, the devices and methods herein employ the use of coordinates from one or more global or regional coordinate systems (e.g., a satellite navigation system). These systems include, but are not limited to, those of the Global Positioning System (GPS), the Global Navigation Satellite System (GLONASS), the BeiDou Navigation Satellite System (BDS), Galileo, the Quasi-Zenith Satellite System (QZSS), and the Indian Regional Navigation Satellite System (IRNSS), as well as any other present or future systems that provide an express coordinate for a given position about the earth with or without the use of satellites. As used herein, the term "global coordinate" is intended to refer to a coordinate or equivalent thereof from any of the above or similar systems. In many embodiments, the global coordinates will be GPS coordinates, but one of skill in the art will appreciate that the use of the term "GPS coordinate" herein is not limiting, at least for the reasons stated above.

Systems and Devices

The system functions to dispatch and navigate a UAV to a target location. As shown in FIG. 1, the system 100 can comprise, in many embodiments, a UAV 102 in communication 125 with a navigation module 152. The UAV 102 can comprise a UAV processor or microcontroller 104 in communication with a UAV memory 106 that can store various machine-readable instructions executable by the UAV processor or microcontroller 104. The UAV 102 can additionally comprise propulsion means (not shown), such as any number of rotors or engines, power supplies (not shown) to power the propulsion means, a housing (not shown) to provide structural strength to the UAV, and all the wiring and electronic components necessary to complete an operable UAV as appreciated by those of skill in the art. The UAV memory 106 can store various machine-readable instructions executable by the UAV processor or microcontroller 104 such that the UAV 102 is able to operate its propulsion means in a controlled manner appreciated by those of skill in the art in addition to the specific tasks as described herein.

In further embodiments, the UAV 102 can comprise at least one scouting sensor 108 that collects various data about its environment. Scouting sensors 108 can include, but are not limited, to a camera, an infrared camera, a microphone, an acoustic sensor a light detecting and ranging (LiDAR)

sensor, an ultrasound, a sonar, a radar, a gyroscope, an electrochemical toxic gas sensor, a thermometer, a humidity sensor, a proximity sensor, a barometric air pressure sensor, a radiation sensor, or a combination thereof. The at least one scouting sensor 108 can collect data and store it locally on the UAV memory 106. In other embodiments, the UAV can transmit the data collected by the at least one scouting sensor 108 to the navigation module 152 or to another device, such as a user device (not shown). In certain embodiments, the UAV can transmit the data collected by the at least one scouting sensor 108 to one or more devices that are a part of a cloud computing system as described herein. In some embodiments, the cloud computing system can run one or more virtual machines or components.

In many embodiments, the navigation module 152 comprises a navigation module processor 154 and a navigation module memory 156 that stores machine-readable instructions executable by the navigation module processor 154 as well as 3D map data 160. In some embodiments, the 3D map data 160 can be a LiDAR map (e.g., a LiDAR topographic map) of an area. In other embodiments, the 3D map data 160 can include additional data, such as that of photogrammetry and other digital vision calculations that generate topographic and structural information. The 3D map data 160 can account for one or more of: the ground surface topography as well as the extent and height of tree cover and other obstructions (e.g., telephone poles, streetlights, traffic lights, etc.) in various embodiments. In some embodiments, the 3D map data includes a cross-reference or alignment of LiDAR map data with global coordinates. In these embodiments, a global coordinate can be used to lookup or return one or more of the LiDAR topography, satellite imagery, or other associated data of a given location. In some embodiments, the navigation module can be a virtual machine or can include one or more virtual components.

In some embodiments, the 3D map data 160 further includes zone indicator tags that assign a value readable and manipulable by the system as described herein. The zone indicator tags represent other considerations useful for navigating a UAV through or around certain regions of the 3D map data 160. In some embodiments, these zone indicator tags can include, but are not limited to, geofenced no-fly zones, drop-off or landing zones, collision risk indicators, weather risk indicators, environment risk indicators, or a combination thereof. For example, a geofenced no-fly zone indicator tag can inform the navigation module during its calculations as discussed below, that the UAV should not enter that area (e.g., the area marks an airport where it is hazardous to fly a UAV). A geofenced no-fly zone can also set an altitude maximum in some embodiments, meaning that a UAV is allowed to fly within a certain region as long as it remains beneath a predetermined altitude. A geofenced no-fly zone, in some embodiments, can be a temporary or permanent. In various embodiments, geofenced no-fly zones can be incorporated automatically from Notice to Airmen (NOTAM) messages or Temporary Flight Restrictions (TFR) from relevant aviation and government authorities. A drop-off or landing zone indicator tag can inform the navigation module of an area predetermined as safe to drop-off materials (e.g., a package for delivery, supplies, a life vest, etc.) or on which to land. In many embodiments, a drop-off or landing zone indicator tag denotes a region that is both generally free of hazards and sufficiently open and accessible for a UAV. Example areas that can be tagged with a drop-off or landing zone indicator tag include, but are not limited to, rooftops of some buildings and open fields. A collision risk indicator, for example, can denote a region in which a greater risk for accidental collision exists but is not adequately represented in the 3D map data 160 alone, in certain embodiments. For example, areas with lots of electrical or telephone wires or thin tree branches can be marked with a collision risk indicator. A weather risk indicator, in many embodiments, can mark where hazardous weather conditions (e.g., very strong winds, hail, lightning, etc.) are currently present and thus represent a risk to the UAV. An environment risk indicator can, in many embodiments, represent any other risk inherent to the specific location of the 3D map data 160 not already described. For example, an area currently experiencing a wildfire could be labeled with an environment risk indicator to denote an area of high heat or low visibility due to the smoke. In certain embodiments, the environment risk indicator can also be used to mark a zone in which the 3D map data 160 is suspected to be deficient, inaccurate, and/or changed since the collection of the 3D map data 160 (e.g., a section of a forest after it has burned). In some embodiments, the collision risk indicator, weather risk indicator, and/or environment risk indicator can comprise a scalar value describing a greater or lesser risk compared to others of its type. In other embodiments, the above zone indicator tags can be all collectively or in subsets merged into single values to represent a combined risk for the UAV in that area of the 3D map data 160 that can be considered by the system 100 during a route calculation, as described herein. Additional types of zone indicator tags can be included without deviating from the scope of this disclosure. In various embodiments, 3D map data (i.e., LiDAR or photogrammetry calculations with or without zone indicator tags) can be provided to the system either by manual input and/or automatic upload including from integrated third-party systems.

In some embodiments, the system 100 can store common route data as part of the 3D map data 160. In these embodiments, common route data represent a previously calculated preferred route (e.g., see FIG. 4) between a frequently used starting point and a frequently used target location for the UAV 102. In this way, the system 100 can save time by utilizing common route data to provide the previously calculated preferred route as a potential route when the navigation module 152 identifies relevant starting points and target locations instead of regenerating the previously used route. In many embodiments, the potential route provided by the common route data will be subsequently analyzed for transient 3D map data (e.g., weather and environment risk indicators) and possibly adjusted or rejected before being transmitted to the UAV 102 as the preferred route for the given occasion.

The navigation module memory 156, in many embodiments, is capable of receiving updated 3D map data 160. In many of these embodiments, when the navigation module memory 156 receives updated 3D map data 160, it appropriately uses the updated data 160 for any future operations unless otherwise instructed to retrieve and utilize outdated data 160. The updated 3D map data can include new LiDAR map portions (e.g., new LiDAR scans of buildings newly constructed or forests cleared since a previous scan), new photogrammetric calculations, as well as new or updated zone indicator tags. In some embodiments, updates of certain portions of the 3D map data 160 can happen comparatively infrequently (e.g., new LiDAR scans) compared to other portions of the 3D map data (e.g., weather indicator tags can update on a live update schedule, in some embodiments). In other embodiments, new drop-off or landing zone indicator tags can be provided live as updated 3D map data while a UAV 102 is en route to a nearby location. In further embodiments, the at least one scouting sensor 108 can collect new 3D map data 160 while en route to a target location. In these embodiments, this newly collected 3D map data 160 can be immediately analyzed by the navigation module 152 to generate updated or alternative routes for the UAV 102. In some embodiments, artificial intelligence (AI) or machine learning (ML) techniques can be employed to analyze the new 3D map data 160 (e.g., visual images of a location) collected by the at least one scouting sensor 108 en route to further inform decisions by the navigation module 152. For example, the scouting sensor 108, in one embodiment, can collect new LiDAR scans that reveal to the navigation module 152 obstructions or clearings previously unknown. In another example, the scouting sensor 108 can detect and monitor weather or environmental conditions that contribute new or updated weather or environmental risk indicators to the 3D map data.

The UAV 102 and the navigation module 152 are in communication 125 with each other. In certain embodiments, each are also in communication with one or more user devices (not shown). In some embodiments, a user device can be a virtual user device. A wide variety of user devices can be employed, including those with augmented reality (AR) and virtual reality (VR) capabilities as descried herein. In further embodiments, a singular navigation module 152 can be in communication with a plurality of UAVs 102. In some embodiments, a singular navigation module 152 can be in communication with and direct a plurality of UAVs 102 to the same target location. In other embodiments, a singular navigation module 152 can be in communication with and direct a plurality of UAVs to unique target locations. In still further embodiments, a UAV 102 can be in communication 125 with one or more separate UAVs 102. In some embodiments, the UAV 102 and the navigation module 152 are in communication 125 with each other by at least one of cellular, Wi-Fi, radio frequency, infrared frequency, optical systems, laser systems, or satellite networks. In other embodiments, the plurality of UAVs 102 is in communication 125 with each other by at least one of cellular, Wi-Fi, radio frequency, infrared frequency, optical systems, laser systems, or satellite networks. When it is said herein that components of the system 100 (e.g., a UAV 102 and navigation module 152) are in communication with each other, one of skill in the art will appreciate that the components then comprise the necessary hardware and store any necessary machine-readable instructions in order to utilize the communication protocol or method. In this manner, the UAV 102 and the navigation module 152 can be considered to each comprise a communications module (not shown) in certain embodiments where appropriate. In other embodiments, a communication protocol or method can be selected based on the 3D map, the zone indicator tags, communication protocol availability. In some embodiments, if one protocol is not available, communication can be switched to another protocol or method.

In other embodiments, the UAV 102 and the navigation module 152 are in communication 125 with each other by at least two of cellular, Wi-Fi, radio frequency, infrared frequency, optical systems, laser systems, or satellite networks. By being in communication over a plurality of communication protocols or methods, a redundancy is built into the system 100 in case any portion of the system 100 takes damage.

In some embodiments, the UAV 102, the navigation module 152, and one or more user devices are in communication 125 with each other by at least one of cellular, Wi-Fi, radio frequency, infrared frequency, optical systems, laser systems, or satellite networks. In other embodiments, the UAV 102, the navigation module 152, and one or more user devices are in communication 125 with each other by at least two of cellular, Wi-Fi, radio frequency, infrared frequency, optical systems, laser systems, or satellite networks. Furthermore, in some embodiments various components of the system 100 are in communication simultaneously over a plurality of communication protocols or methods for different purposes. For example, satellite networks can be used for the one-way transmission of global coordinate information while a cellular network is used to send commands and receive data from the at least one scouting sensor 108. In other embodiments, location data regarding the position of the UAV 102 and/or one or more user devices can be sent to the navigation module 152 by a communication protocol other than a satellite network to allow the system 100 to operate in contingencies wherein an appropriate satellite network cannot be reached. In further embodiments, RFID tags and readers can be implemented on the UAV 102 and other devices or objects (e.g., a user device, equipment or a package for delivery, other UAVs, etc.) for their detection and identification by the UAV 102 or navigation module 152. In some of these embodiments, the RFID tags and readers can facilitate the ability for a plurality of UAVs 102 to fly in formation or for a singular UAV to identify one package for delivery among many.

In some embodiments, the UAV 102 and the navigation module 152 are physically separate devices. In these embodiments, they can then communicate 125 via wireless systems as described above. In other embodiments, the navigation module 152 is physically attached to the UAV 102. This can be by mechanically fastening a housing (not shown) containing the navigation module 152 to the UAV 102. In certain versions of this embodiment, the navigation module 152 can be adapted to draw its electrical power from a separate power supply (not shown) or from the same one or more power supplies (not shown) of the UAV 102. In some embodiments where the navigation module 152 is fastened to the UAV 102, the UAV 102 and navigation module 152 can still communicate 125 via wireless systems as described above.

In other embodiments, the navigation module 152 is electronically integrated into and in circuit communication with the UAV 102. In certain embodiments, the terms "electronically integrated" and "in circuit communication" are unified in a singular electronic system, sharing at least a portion of their features and circuitry. For example, in an embodiment wherein the navigation module 152 is electronically integrated and in circuit communication with the UAV 102 a singular processor or microcontroller that performs all the steps described of both the UAV processor or microcontroller 104 and the navigation module processor 154 as described herein. In similar embodiments, there can be a singular memory that stores the machine-readable instructions to be executed by the UAV processor or microcontroller 104 and those by the navigation module processor 154 in addition to storing the 3D map data 160. Having the navigation module 152 electronically integrated and in circuit communication with the UAV 102 can dramatically reduce delay in communication times between the two, in many embodiments. In embodiments wherein the navigation module 152 is electronically integrated into and in circuit communication with the UAV 102, the UAV 102 can be considered to comprise the navigation module 152.

In still other embodiments, the navigation module 152 comprises a plurality of navigation module processors 154 and navigation module memories 156 operating as a cloud computing system in communication 125 with the UAV 102 and, in some embodiments, a user device (not shown). In these embodiments, the hardware of the navigation module 152 is not exposed to the same hazards as the UAV 102 during a flight of the UAV 102. Furthermore, the use of a cloud computing system can expedite the speed of route calculations of the navigation module 152 as described herein in certain embodiments. In some embodiments, the cloud computing system can include various one or more virtual machines or virtual components. In these embodiments, the virtual machines and components can emulate various hardware components and software operations that facilitate the performance of the system and methods described herein, including, but not limited to, the navigation module and user device. In still further embodiments, the navigation module can employ artificial intelligence (AI) and/or machine learning (ML) techniques, including but not limited to those involving computer vision, image processing, and pattern discovery, recognition, and classification as well as those employed for route optimization. In some embodiments, a single navigation module 152 can be in communication 125 with and navigate a plurality of UAVs 102.

A variety of user devices can be employed across many embodiments. In some embodiments, the user device can be a tablet, a mobile device (e.g., a mobile phone), a personal computer, a laptop computer, an augmented reality (AR) device, a virtual reality (VR) device, a wearable device (e.g., glasses, a watch, etc.), etc. In other embodiments, the user device can be a virtual machine (e.g., a virtual user device). In some embodiments, the user device comprises a display that displays various information regarding the UAV 102, including but not limited to a location of the UAV 102, one or more actual or potential flight paths of the UAV 102, as well as any data collected by the scouting sensor 108 of the UAV. In some embodiments, the display can include the display of an AR device, such as a pair of glasses with an AR heads-up display (HUD) or a similar HUD displayed onto the windshield of a vehicle. In other embodiments, the display can include the display of a VR device, such as a pair of virtual reality goggles with or without additional peripheral devices. In various embodiments, a user can input user inputs via a VR or AR user device by performing physical gestures with or without the use of additional wearable or peripheral devices such as gloves containing markers or cameras. In other embodiments, the user device is capable of receiving user input from the user and submitting it to at least one of the UAV 102 and/or the navigation module 152. This input (e.g., voice, text, haptic, etc.) can include, but is not limited to, a selection of a target location and/or a selection of one or more flight paths of the UAV, as described herein. In still further embodiments, the input can include a manual override command and subsequent manual maneuver inputs that allow a user to navigate and maneuver the UAV 102 manually via the user device. In some embodiments, a single user device can provide one or more of the above and/or additional functions. In other embodiments, multiple user devices, each capable of a subset of one or more of the above or additional functions, are in communication with the UAV 102 and navigation module 152 for the purposes of accomplishing the various technological features of the user device as described herein. For example, a first user device can comprise a display for displaying information regarding the UAV 102 and can transmit flight path selections to the UAV 102 or navigation module 152 while a second user device is capable of sending a manual override command and manual maneuver inputs to the UAV 102 and/or navigation module 152.

Figures 2A, 2B, 2C:
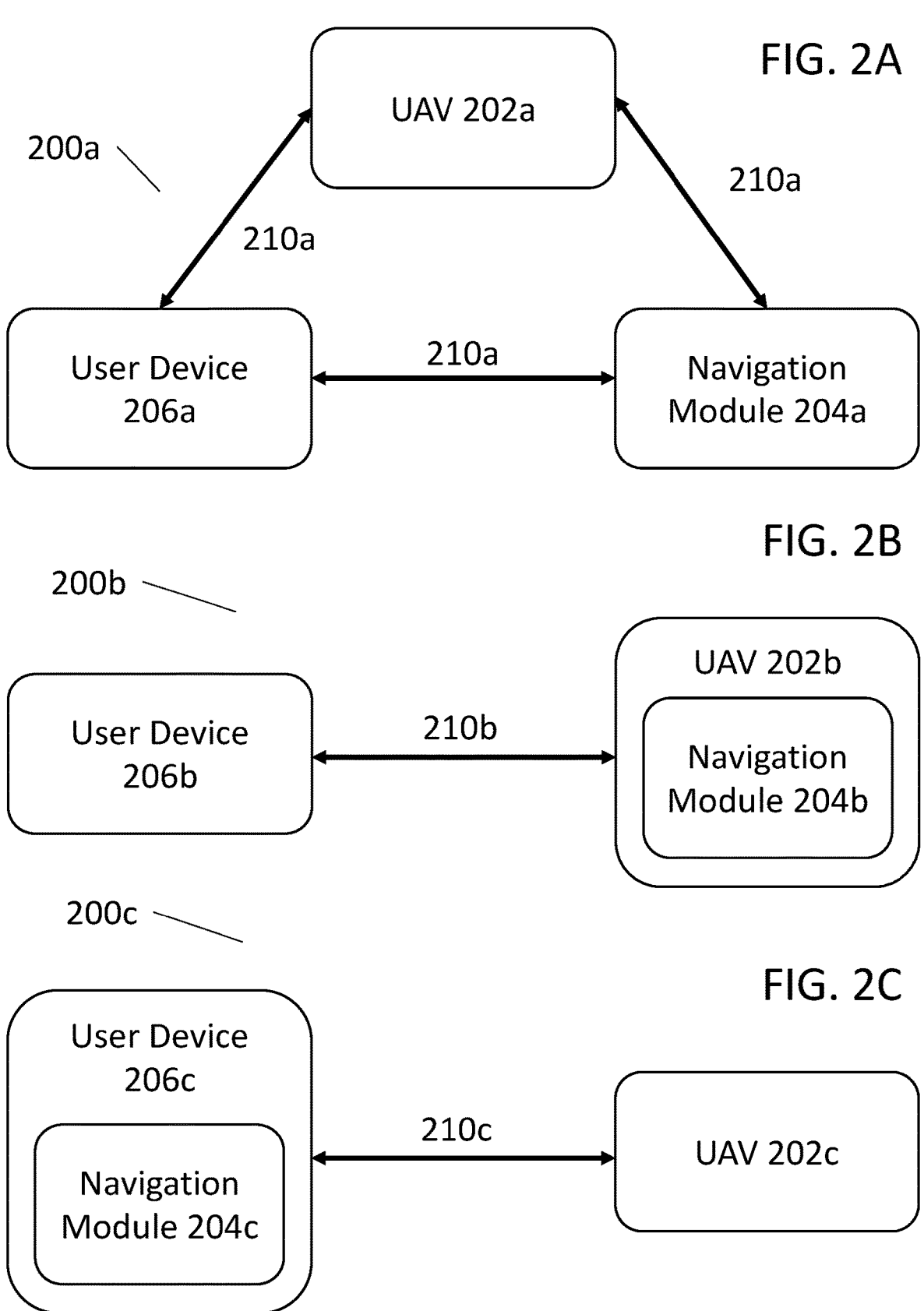
FIGS. 2A-C illustrate block diagrams of various embodiments of the system components.

FIGS. 2A-C depict various embodiments of the system comprising a UAV, a navigation module, and at least one user device. As shown in FIG. 2A, the system 200a can comprise physically separate UAV 202a, navigation module 204a, and user device 206a, all in communication 210a with each other in many embodiments. In certain embodiments, the user device 206a can comprise a plurality of user devices. In some embodiments, the navigation module 204a can be a cloud computing system, as described herein. In other embodiments, the navigation module 204a can be physically attached to the UAV 202a but not electronically integrated or in circuit communication with it as described herein. In these embodiments, separate channels of communication 210a can be required between all three of the UAV 202a, navigation module 204a, and the user device 206a. Any two of the UAV 202a, navigation module 204a, and user device 206a can be in communication 210a with each other by at least one of cellular, Wi-Fi, radio frequency, infrared frequency, optical systems, laser systems, or satellite networks, as described herein in some embodiments. In other embodiments, any two of the UAV 202a, navigation module 204a, and user device 206a can be in communication 210a with each other by at least two of cellular, Wi-Fi, radio frequency, infrared frequency, optical systems, laser systems, or satellite networks, as described herein. In certain embodiments, all three of the UAV 202a, navigation module 204a, and user device 206a can be in communication 210a with each other by at least one of cellular, Wi-Fi, radio frequency, infrared frequency, optical systems, laser systems, or satellite networks, as described herein in some embodiments. In still further embodiments, all three of the UAV 202a, navigation module 204a, and user device 206a can be in communication 210a with each other by at least two of cellular, Wi-Fi, radio frequency, infrared frequency, optical systems, laser systems, or satellite networks, as described herein.

FIG. 2B shows an alternative embodiment of the system 200b where the UAV 202b comprises the navigation module 204b as described herein. Because the navigation module 204b is electronically integrated and in circuit communication with the UAV 202b, the system 200b can be considered to only need to account for communication 210b between the user device 206b and the UAV 202b. In certain embodiments, the user device 206b can be a plurality of user devices. In some embodiments, the UAV 202b and the user device 206b can be in communication 210b with each other by at least one of cellular, Wi-Fi, radio frequency, infrared frequency, optical systems, laser systems, or satellite networks as described herein. In other embodiments, the UAV 202b and the user device 206b can be in communication 210b with each other by at least two of cellular, Wi-Fi, radio frequency, infrared frequency, optical systems, laser systems, or satellite networks as described herein.

FIG. 2C shows an alternative embodiment of the system 200c where the navigation module 204c is electronically integrated and in circuit communication with the user device 206c. In these embodiments, the user device 206c can be considered to comprise the navigation module 204c. In some embodiments, the user device 206c can be a plurality of user devices, only one of which comprising the navigation module 204c. In still other embodiments, the user device 206c can be a plurality of user devices, each comprising a portion of the technological features of the navigation module 204c, as described herein. In these embodiments, the plurality of user devices can all be in communication 210c with each other in addition to being in communication 210c with the UAV 202c. In some embodiments, the UAV 202c and the user device 206c can be in communication 210c with each other by at least one of cellular, Wi-Fi, radio frequency, infrared frequency, optical systems, laser systems, or satellite networks, as described herein. In other embodiments, the UAV 202c and the user device 206c can be in communication 210c with each other by at least two of cellular, Wi-Fi, radio frequency, infrared frequency, optical systems, laser systems, or satellite networks, as described herein.

In various embodiments of FIGS. 2A-2C, one or more the UAV 202a, 202b, 202c, the navigation module 204a, 204b, 204c, and the user device 206a, 206b, 206c can be configured to be compatible with various third-party software modules and hardware components, allowing for the customizability of the system 200 towards specific use cases.

Figure 3:
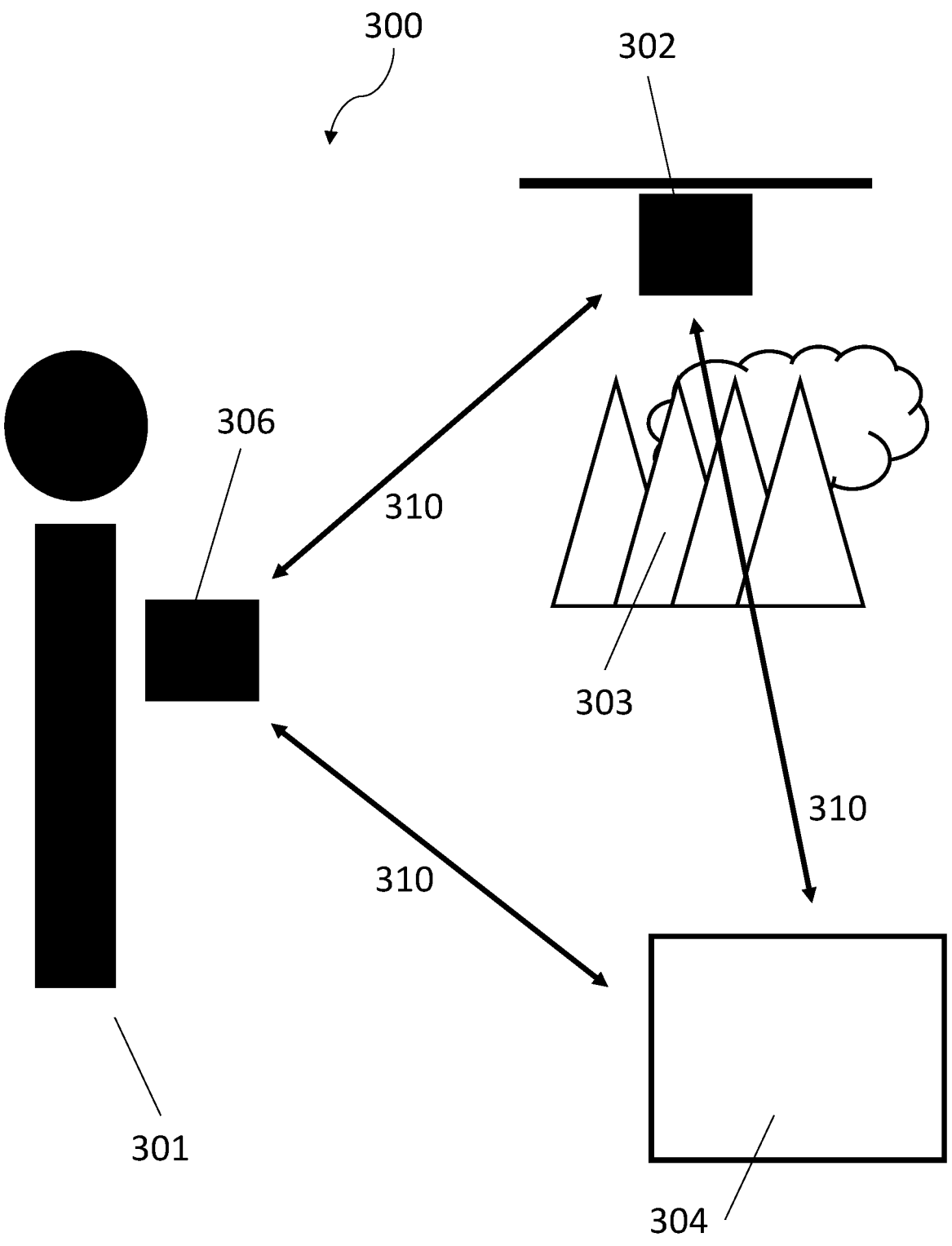
FIG. 3 illustrates a cartoon of one embodiment of the system during an intended use.

FIG. 3 depicts a cartoon of one embodiment of the system 300 during an intended use. A user 301, such as an incident commander of an emergency response team, would like to deploy a UAV 302 to a target location 303 where an emergency is currently occurring in order to acquire data from at least one scouting sensor (not shown) on the UAV 302. Via a user device 306 that is in communication 310 with the UAV 302 and a navigation module 304, the user 301 can input the target location 303 into the system 300. Using its 3D map data (not shown), the navigation module 304 can calculate a preferred route (i.e., a flight path) as described herein that dispatches the UAV 302 to the target location 303. As described herein, the navigation module 304 can additionally autonomously check to see if the UAV 302 has deviated from the preferred route and correct course accordingly. Furthermore, as described herein, the navigation module 304 can suggest exploratory routes to the user 301 via the user device 306 in various embodiments.

Methods

Figure 4:
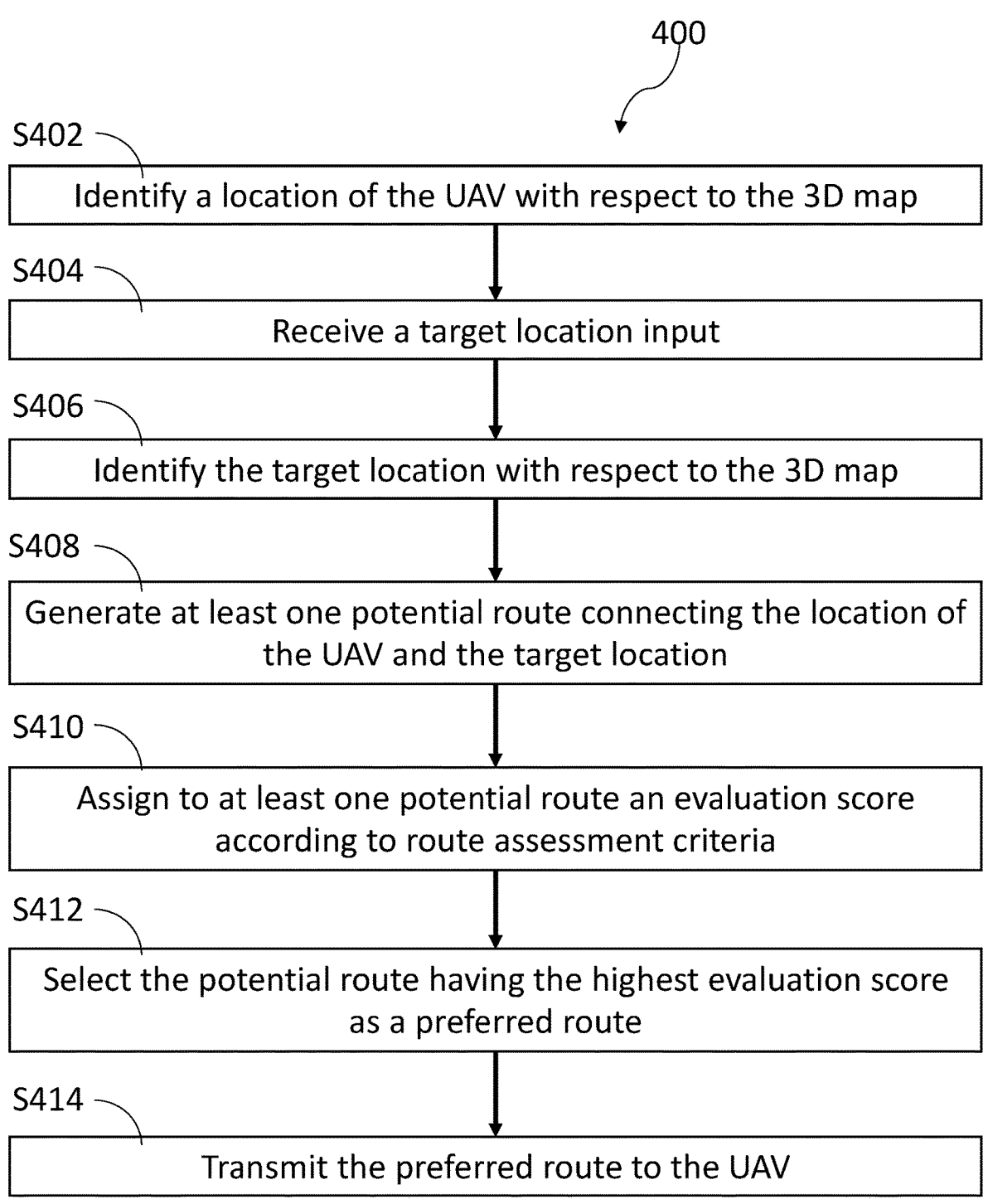
FIG. 4 illustrates a method for generating a preferred route for a UAV to a target location.

FIG. 4 depicts an embodiment of a method 400 for generating a preferred route for a UAV to a target location. As used herein, the term "route" and "flight path" are considered equivalent and can be used interchangeably. In many embodiments, machine-readable instructions stored on the navigation module memory can cause the navigation module to perform the method 400 of FIG. 4. As shown, an embodiment of this method 400 includes identifying a location of the UAV with respect to the 3D map in block S402, receiving a target location input in block S404, identifying the target location with respect to the 3D map in block S406, generating at least one potential route connecting the location of the UAV and the target location in block S408, assigning to at least one potential route an evaluation score according to route assessment criteria in block S410, selecting the potential route having the highest evaluation score as a preferred route in block S412, and transmitting the preferred route to the UAV in block S414. The method 400 is used for disaster and emergency response teams but can additionally, or alternatively, be used for any suitable applications, where the semiautonomous navigation of a UAV is desired. In many embodiments, the generation of the preferred route can be considered an optimization problem towards risk analysis. One of skill in the art will appreciate the variety of specific computational methodologies that can be employed including, but not limited to, simplex, fuzzy logic, and Symbiotic Organisms Search (SOS) methodologies. In still further embodiments, artificial intelligence (AI) and/or machine learning (ML) techniques can be utilized to perform the optimization calculations. The blocks of method 400 and subsequent methods described herein present an organization of the analyses required and is not intended to be limited by any specific computational methodology.

In block S402, the method 400 includes identifying a location of the UAV with respect to the 3D map. In order to calculate a route for the UAV to a target location, the navigation module can begin by identifying a current or starting location of the UAV. In some situations, the UAV can be grounded on a landing pad or any solid surface, whereas in other situations, the UAV can be currently in flight, either moving to a new location (e.g., the target location, on a scheduled patrol, etc.) or holding a stable position in the air. In certain embodiments, the UAV is deployed from a consistent starting position, such as a defined landing pad at a base of operations of an emergency response team. In other embodiments, a user can first transport (e.g., by car) the UAV to a unique starting point from which to begin a use of the system. In still other embodiments, the UAV can be deployed from a moving vehicle, such as a fire engine en route to an incident. In many embodiments, the method 400 employs global coordinate tracking technology and/or similar systems as appreciated by those of skill in the art, to assist in the performance of block S402; however, in these embodiments, the global coordinates or similar identifier can then be cross-referenced or otherwise further identified with respect to the 3D map.

In block S404, the method 400 includes receiving a target location input. In many embodiments, the target location input is received from a user device that collected a user input. For example, this can be from a manual user input via a GUI on a display of a user device (e.g., a tablet or mobile device) or via a phone call on a mobile phone to emergency services in which the phone's global coordinates are directly transmitted with the phone call. In other embodiments, the target location input can be received from an automated system in communication with the navigation module, such as a computer-aided dispatch (CAD) system. Because a user must originally have inputted the target location into the CAD system, the CAD system can also be considered a user device in some embodiments. In still further embodiments, the target location input can be received from a sensor on any device integrated into the system either directly or via a CAD or equivalent system. For example, a smoke detector adequately integrated into the system (e.g., into an "Internet of Things" arrangement) can send its global coordinates upon detecting smoke. Other examples can include, but are not limited to motion detectors, microphones, thermometers, and other sensors capable of detecting a situation in which the deployment of a UAV to its location is desired. In these embodiments, any device with such a sensor can be considered a user device because a user necessarily had to arrange the device to do so. In various embodiments, third party systems that can perform the detection of emergencies by predefined parameters and transmission of subsequent information can be integrated into the system of the disclosure herein to provide a target location input. Additionally, third party systems that allow for the direct transmission of a target location input (or the equivalent thereof) from a phone call to a CAD can also be integrated into the system of the disclosure herein in certain embodiments. In many embodiments, the target location can be received as global coordinates or a similar geographical location reference technique or format. In some embodiments, the target location can be a plurality of locations to be visited by a UAV in sequence.

In block S406, the method 400 includes identifying the target location with respect to the 3D map. In certain embodiments, this can include correlating a global coordinate or other indicator with a location on the 3D map. One of skill in the art will appreciate that blocks S402-S404 can be performed in various orders without deviating from the scope of the disclosure.

In block S408, the method 400 includes generating at least one potential route connecting the location of the UAV and the target location. Various considerations and techniques, including, but not limited to, AI or ML techniques, can be used to generate the at least one potential route. In many embodiments, the at least one potential route considers movement in all three dimensions, (i.e., changes in latitude, longitude, and altitude) as well as 3D map data such that the at least one potential route does not intersect with known obstacles (e.g., trees, buildings, hillsides, etc.). In embodiments where there is a plurality of target locations, the at least one potential route can include a sequential visiting of the plurality of target locations. In other embodiments having a plurality of target locations, the at least one potential route can be a "patrol" route that continuously loops the UAV through at least a portion of the plurality of target locations.

In further embodiments, the at least one potential route is generated according to additional route constraint criteria comprising at least one of: a collision safety buffer, a total route distance or time, a maximum altitude, at least one geofenced no-fly zone, a remaining battery life of the UAV, or a combination thereof.

In some embodiments, a collision safety buffer defines a maximum distance between potential routes and a known obstacle, as described by the 3D map data. Although a LiDAR-generated 3D map can be very accurate in certain embodiments, it can be of interest to some users in some situations to further reduce the risk of collision by limiting the UAV's movement to within a certain buffered distance of the known obstacles. In some embodiments, the collision safety buffer can be from about 0.25 meters to about 100 m. In some further embodiments, the collision safety buffer can be from about 0.25 m to about 50 m. In other embodiments, the collision safety buffer can be from about 0.25 m to about 10 m. In still other embodiments, the collision safety buffer can be from about 0.25 meters to about 5 m. In further embodiments, the collision safety buffer can be from about 0.25 meters to about 2.5 m. In still further embodiments, the collision safety buffer can be about 1 m. In some embodiments, different types of obstacles captured by the 3D map can be categorized (e.g., trees, buildings, etc.), and a different collision safety buffer can be applied to each category of obstacle. For example, route constraint criteria can allow for the at least one potential route to pass within 1 m of a building but only within 5 m of a tree, in one embodiment. In other embodiments, different species of trees can be defined as separate categories of obstacles and thus assigned different collision safety buffers to account for variance in growth since the previous LiDAR scan or other update of the 3D map.

A total route distance or time, as a route constraint criterion, places a limitation on the total allowed travel distance or time for the at least one potential route in some embodiments. In certain embodiments, this limitation can be useful in order to avoid or reduce wear-and-tear and/or reliability concerns of certain UAVs. For example, it could be known that a specific UAV model suffers notable rotor damage for flights surpassing a flight time of five hours; thus, this route constraint criterion would limit the system from generating a potential route that risked this wear. In some embodiments, the total allowed travel distance or time can vary for different models of UAVs. The term "total route distance" and "total route time" are intended to mean the distance or time required to maneuver the UAV from a starting position to the target location. In certain embodiments, however, a suggested exploration route can be designed to loop back to its starting position. In some embodiments, the total route distance, as a route constraint criterion, can be from about 10 m to about 10 km. In other embodiments, the total route distance can be from about 100 m to about 10 km. In still other embodiments, the total route distance can be from about 250 m to about 10 km. In still some further embodiments, the total route distance can be from about 250 m to about 5 km. In further embodiments, the total route distance can be from about 100 m to about 5 km. In still further embodiments, the total route distance can be from about 100 m to about 1000 m. In additional embodiments, the total route distance can be from about 10 m to about 500 m. In some embodiments, the total route time, as a route constraint criterion, can be from about 1 minute to about 12 hours. In other embodiments, the total route time can be from about 5 minutes to about 4 hours. In still other embodiments, the total route time can be from about 30 minutes to about 4 hours. In further embodiments, the total route time can be from about 1 hour to about 2 hours. In still further embodiments, the total route time can be from about 1 hour to about 8 hours. In additional embodiments, the total route time can be from about 1 hour to about 6 hours. In many embodiments, the total route distance or time, as a route constraint criterion, is determined according to the known capacities of the UAV being deployed.

A maximum altitude, as a route constraint criterion, places a limitation on the highest altitude the at least one potential route is allowed to reach, in some embodiments. In certain circumstances, some UAV models may not be reliable or operable above certain altitudes, or there may be laws against flying UAVs above certain altitudes in some areas. Therefore, in these embodiments, a maximum altitude route constraint criterion prevents the generation of a potential route that endangers the UAV or breaks regional legislation. In many embodiments, the maximum altitude, as a route constraint criterion, is determined according to the known capacities of the UAV being deployed.

A geofenced no-fly zone, as a route constraint criterion, excludes the generation of a potential route that passes through restricted areas as determined by zone indicator tags of the 3D map, as described above in some embodiments. Additionally, as described above, a maximum altitude constraint can be alternatively identified as geofenced no-fly zones with an appropriate altitude exception, in some embodiments.

A remaining battery life, as a route constraint criterion, considers the projected flight time available based on the present amount of battery power of the UAV, and prevents the generation of potential routes that would fully deplete the power supply before its arrival to the destination, in some embodiments. In other embodiments, the remaining battery life route constraint criterion further considers the duration of the full round trip (i.e., to the location of interest and back to the starting point of the UAV), thereby preventing the generation of a fully-depleting round trip potential route. In still further embodiments, the remaining battery life route constraint criterion further considers the duration of the full round trip plus a predetermined amount of hovering, surveilling, and/or exploring time at the target location. In many embodiments, a remaining battery life, as a route constraint criterion, is determined according to the known capacities of the UAV being deployed.

In block S410, the method 400 includes assigning to at least one potential route an evaluation score according to route assessment criteria in many embodiments. In various embodiments, the route assessment criteria can comprise at least one of a total route distance or time, a minimum altitude change, a maximum altitude, a duration of travel time spent above a predetermined altitude threshold, collision risk indicators, weather risk indicators, environment risk indicators, or a combination thereof. In many embodiments, the evaluation score for a potential route is a composite of individual scores for each route assessment criteria applied to the potential route. In some embodiments, the individual scores for each route assessment criteria can be compiled evenly to generate the evaluation score. In other embodiments, the individual scores can be weighted according to a predetermined metric or function. In some embodiments, the predetermined metric or function can be produced by an AI or ML technique trained on a data set of exemplary successful and unsuccessful routes having various values for one or more of the above route assessment criteria. For example, a successfully traversed flight path over a mountain or between buildings that passes through or near various zone indicator tags can be used as part of the training data set.

A total route distance or time, as a route assessment criterion, more favorably values potential routes with shorter total travel distances or times for a UAV to reach the target location, in many embodiments. In many circumstances, the shorter the route, the faster the UAV can arrive at the target location, and the saved time can be critical in certain emergency or disaster situations. Furthermore, reducing the total travel distance or time of a UAV can help minimize or reduce the expected wear-and-tear on a UAV over many flights, reducing maintenance and replacement costs. In various embodiments, the score for a potential route's total route distance or time can change linearly, quadratically, geometrically, stepwise or according to another function with increasing distance or time. In many embodiments, potential routes that have a shorter total distance or time compared to other potential routes to the same target location will score better for the total route distance or time route assessment criterion, in many embodiments.

A minimum altitude change, as a route assessment criterion, more favorably values potential routes with less variance in altitude, in many embodiments. In some embodiments, maintaining a constant altitude or a narrow range of altitudes, can be beneficial towards the collection of consistent and reliable data from one or more scouting sensors of the UAV. In other embodiments, frequent and/or extreme changes in altitude can cause greater wear-and-tear to a UAV compared to steady flight at a constant altitude. In various embodiments, the score for a potential route's minimum altitude change can change linearly, quadratically, geometrically, stepwise or according to another function with increasing change in altitude. In many embodiments, potential routes that have a constant altitude or a narrower range of altitude compared to other potential routes to the same target location will score better for the minimum altitude change route assessment criterion.

A maximum altitude, as a route assessment criterion, more favorably values potential routes that stay below a predetermined altitude value in many embodiments. In certain embodiments, operating at higher elevations introduces a greater risk to the UAV than operating at a lower altitude. In various embodiments, the score for a potential route's maximum altitude can linearly, quadratically, geometrically, stepwise or according to another function with increasing altitude. In many embodiments, potential routes that stay beneath a predetermined altitude will score better for the maximum altitude route assessment criterion.

Collision risk indicators, weather risk indicators, and environment risk indicators, as route assessment criteria and alone or in any combination with each other, more favorably value potential routes with a lesser likelihood of possible damage to the UAV in many embodiments. As described above, these indicators serve to quantify various hazards for a UAV that may not have been adequately represented by the LiDAR map alone and can be assigned to the map as zone indicator tags. In many embodiments, when a potential route passes through one or more zones tagged with at least one of these risk indicators tags, the values representing the risk of those zones can be compiled and considered as a route assessment criterion. Potential routes that spend less flight distance or time within hazardous zones tagged with these risk indicators compared to other potential routes to the same target location will score better for the collision risk indicator route assessment criterion, weather risk indicators route assessment criterion, and/or environment risk indicators route assessment criterion. In some embodiments, values associated with individual collision risk indicators, weather risk indicators, and environment risk indicators can be generated by AI or ML techniques trained on data sets of successful and unsuccessful UAV flights through said categories of risk indicators.

Considering one or more route assessment criteria, the method 400 generates and assigns an evaluation score for at least one potential route that represents a potential route's overall preferability and compatibility with the predetermined parameters of the utilized route assessment criteria. In block S412, the method 400 includes selecting the potential route having the highest evaluation score as a preferred route. The term "highest evaluation score" as used herein is intended to indicate the potential route that best fits the parameters of the route assessment criteria; however, the specific details of the calculation and ranking can vary without deviating from the scope of this disclosure. In some embodiments the "highest evaluation score" can be the greatest numerical value among the evaluation scores for each generated potential route. In other embodiments, the "highest evaluation score" can be the lowest numerical value among the evaluation scores for each generated potential route. Regardless of the specifics (including but not limited to the various examples and embodiments disclosed herein), the method selects the potential route having the highest evaluation score as defined herein as a preferred route. In various embodiments, the method 400 can employ simplex, fuzzy logic, and Symbiotic Organisms Search (SOS) methodologies to generate the preferred route. In still further embodiments, artificial intelligence (AI) and/or machine learning (ML) techniques can be utilized to calculate the preferred route.

In certain embodiments, certain route assessment criteria can be ignored and/or a potential route having an inferior evaluation score can be selected when urgency override input is received. In many embodiments, urgency override input can be received from user input on a user device or from automated systems such as a CAD. For example, the method 400 can generate two potential routes through a wildfire to reach a target location of trapped hiker. A first route is much faster but poses a greater risk to the UAV since it must fly through hotter, more hazardous sections of the blaze. The second route is much longer but safer since it avoids the particularly threatening areas. In many embodiments, the method 400 can select the second route, since it would receive a higher evaluation score; however, urgency override input can force the method 400 and/or a system performing the method 400 to select the first route instead. For example, an incident commander at the scene can decide that the saved time in getting the sensors of the UAV to the target location of the trapped hiker is worth a potentially fatal risk to the UAV, and he or she can input the urgency override input on a user device. In some embodiments of this example, the method 400 can be considered to be ignoring the environment risk indicators as route assessment criteria. In other embodiments of this example, the method 400 can be considered to be selecting the potential route having an inferior evaluation score. Another illustrative example of a use for urgency override input can include to deploy a UAV beyond its ability to safely return, meaning the UAV will likely crash, potentially irrecoverably, while at the target location or on its way back.

In some embodiments, the method includes for checking for common route data between the location of the UAV and the target location. As described herein, common route data can store one or more preferred routes connecting a frequently used starting point and frequently used target location. In this manner, the method 400 can save time by utilizing previously preferred routes from the common route data as potential routes for the new instance, thereby avoiding regenerating the old routes on each occasion. In many embodiments, the potential routes provided by the common route data will be subsequently analyzed for transient factors such as weather or environment risk indicators as described herein.

In block S414, the method 400 includes transmitting the preferred route to the UAV. In many embodiments, the preferred route is transmitted to the UAV in a manner that enables the UAV, utilizing its processor or microcontroller and memory, to activate its propulsion means in order to maneuver according to the preferred route to reach the target location. By various embodiments of the method 400, a UAV can be automatically dispatched to a target location by a simple input of the target location using the 3D map data.

Figure 5:
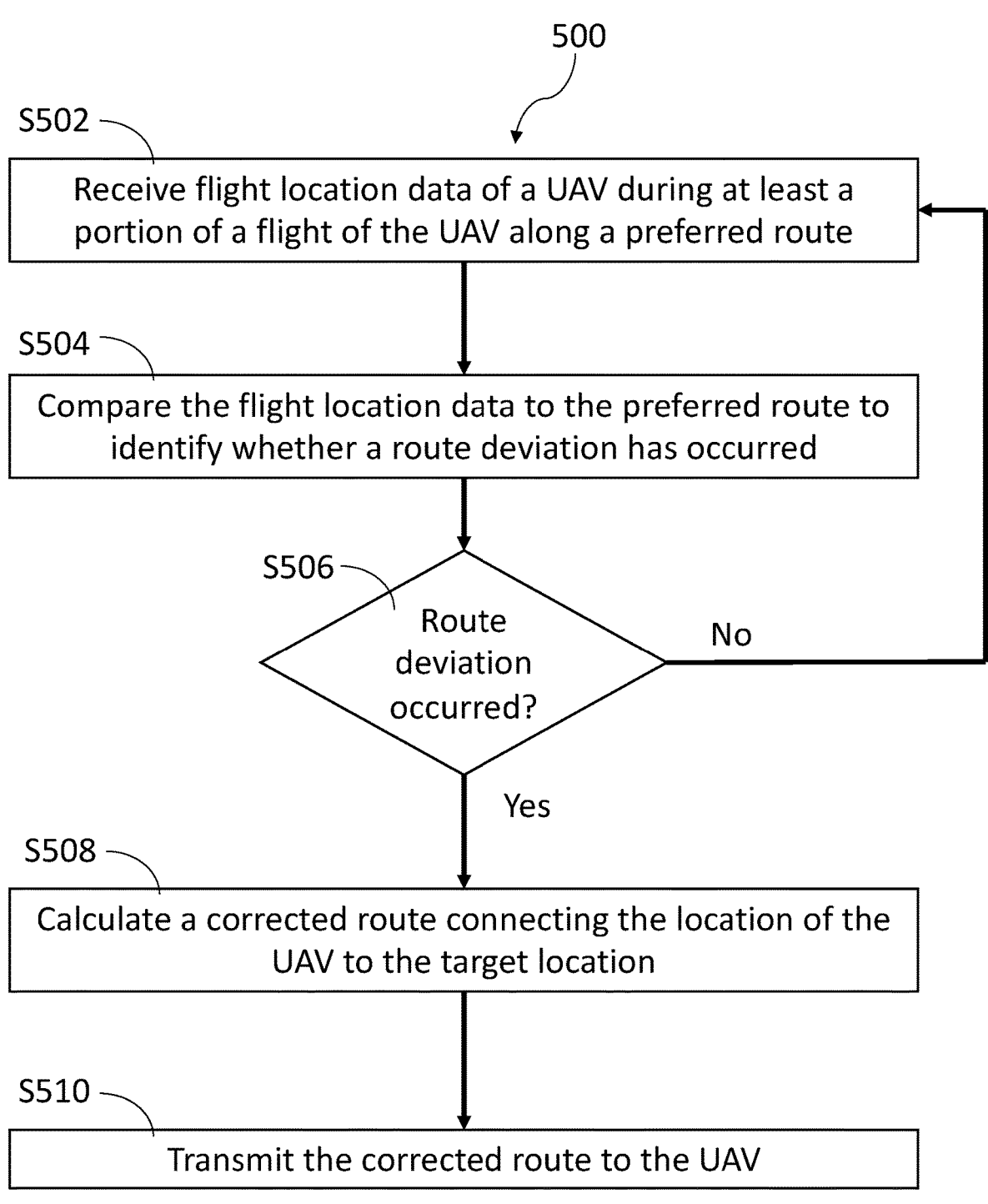
FIG. 5 illustrates a method for monitoring the flight of a UAV to a target location for route deviations and correcting route deviations when they occur

FIG. 5 depicts an embodiment of a method 500 for monitoring the flight of a UAV to a target location (or while on an exploratory route, as described herein) for route deviations and correcting route deviations when they occur. In many embodiments, machine-readable instructions stored on the navigation module memory can cause the navigation module to perform the method 500 of FIG. 5. As shown, an embodiment of this method 500 includes receiving flight location data of a UAV during at least a portion of a flight of the UAV along a preferred route in block S502, comparing the flight location data to the preferred route to identify whether a route deviation has occurred in block S504. Depending on whether a route deviation has occurred, the method 500 either returns to block S502 or advances to block S506. If the method 500 advances, it includes calculating a corrected route connecting the location of the UAV to the target location in block S508 and transmitting the corrected route to the UAV in block S510. In still further embodiments, AI and/or ML techniques can be utilized to perform various portions of the method 500. The blocks of method 500 and subsequent methods described herein present an organization of the analyses required and is not intended to be limited by any specific computational methodology.

In block S502, the method 500 includes receiving flight location data of a UAV during at least a portion of a flight of the UAV along a preferred route. In many embodiments, the preferred route is generated by the method 400 of FIG.

4 or by the system of any of FIGS. 1-3. In alternate embodiments, the flight location data is that of a UAV on an exploratory route described herein, such as one generated by the method 600 of FIG. 6. In some embodiments, global coordinate tracking and/or similar technology, as appreciated by those of skill in the art, can be employed to receive flight location data of the UAV's position during a flight. The flight location data can be cross-referenced or correlated with locations on the 3D map in many embodiments. In some embodiments, flight location data can be received only at regular intervals (e.g., 30 seconds, 1 minute, 2 minutes, 5 minutes, 7 minutes, 10 minutes, etc.). In other embodiments, flight location data is received as frequently and continuously as the employed tracking technology allows.

In block S504, the method 500 includes comparing the flight location data to the preferred route to identify whether a route deviation has occurred. In many embodiments, when a system generates, identifies, and transmits a preferred route to a UAV as in the method 400 of FIG. 4, the system can store a representation compatible with the received location data of the preferred route to be taken. In some embodiments, this can be done by saving a series of GPS coordinates correlated with the 3D map that follows the preferred route. In other embodiments, this can be done by saving a series of global coordinates correlated with the 3D map data as a series of waypoints connected by vectors, linear or otherwise. The method 500 compares the most recent flight location data point to the stored preferred route to determine whether the UAV is still on the preferred route. Route deviations can occur in a variety of ways. For example, a sudden, strong wind could blow the UAV off course, a bird could accidentally strike the UAV, the UAV may have a mechanical, electrical, or computational defect that prevents or impairs it from following the preferred route as originally transmitted, etc.

In block S506, the method 500 proceeds to block S508 if the most recent flight location data received does not align with the stored preferred route (i.e., a route deviation has occurred). If the most recent flight location data received does align with the stored preferred route or at least within a deviation tolerance of it, the method 500 returns to block S502 to continue to receive additional and subsequent flight location data for future comparisons. In some embodiments, the deviation tolerance can be from about 0.25 m to about 10 m. In other embodiments, the deviation tolerance can be from about 0.25 m to about 5 m. In further embodiments, the deviation tolerance can be from about 1 m to about 3 m. In still further embodiments, the deviation tolerance can be about 2 m. In certain embodiments, specific zones or regions of the 3D map can be restricted to narrower or broader deviation tolerances according to zone indicator tags.

In block S508, the method 500 includes calculating a corrected route connecting the location of the UAV to the target location. By calculating a corrected route, the method 500 seeks to adjust the UAV's flight path to one that will guide it to the target location. In some embodiments, the corrected route comprises the shortest maneuver necessary to return it to the preferred route. In other embodiments, such as those wherein a substantial deviation has occurred, the method 500 can calculate a new route to the target location with no or partial overlap to the preferred route. In many embodiments, the calculated corrected route of block S508 can be performed according to similar or identical procedures and considerations of blocks S408-S410 (i.e., generating at least one corrected route according to route constraint criteria, and evaluating the at least one corrected route according to route assessment criteria.) As described herein, AI and/or ML techniques can be utilized in some embodiments to perform the analysis of the route assessment criteria to generate a corrected route.

In block S510, the method 500 includes transmitting the corrected route to the UAV. In many embodiments, the corrected route is transmitted to the UAV in a manner that enables the UAV, utilizing its processor or microcontroller and memory, to activate its propulsion means in order to maneuver according to the corrected route to reach the target location. By various embodiments of the method 500, a UAV can be automatically dispatched to a target location even if the UAV unexpectedly deviates from the originally provided preferred route.

FIG. 6 depicts an embodiment of a method 600 for monitoring the position of a UAV in flight, generating and suggesting exploration maneuvers to a user, and executing upon the selected maneuvers. In many embodiments, machine-readable instructions stored on the navigation module memory can cause the navigation module, in communication with a user device, to perform the method 600 of FIG. 6. As shown, an embodiment of this method 600 includes receiving flight location data of a UAV during at least a portion of a flight of the UAV in block S602, matching the location data to a position on the 3D map in block S604, generating at least one suggested exploration route based on exploration criteria and route constraint criteria in block S606, optionally assigning to at least one suggested exploration route a risk evaluation score according to exploration risk assessment criteria in optional block S608, displaying the at least one suggested exploration route on a display of a user device in block S610, receiving a selected exploration route from user input in block S612, and transmitting the selected exploration route to the UAV in block S614. In still further embodiments, AI and/or ML techniques can be utilized to perform various portions of the method 600. The blocks of method 600 and subsequent methods described herein present an organization of the analyses required and is not intended to be limited by any specific computational methodology.

In block S602, the method 600 includes receiving flight location data of a UAV during at least a portion of a flight of the UAV. In various embodiments, the flight of the UAV can include, but is not limited to, a portion of a movement along a preferred or corrected route to reach a target location, a portion of a patrolling maneuver between multiple target locations, a portion of a movement along a selected exploration route as described herein, and a hovering or holding maneuver at a target location. In some embodiments, global coordinate tracking and/or similar technology, as appreciated by those of skill in the art, can be employed to receive flight location data of the UAV's position during a flight. The flight location data can be cross-referenced or correlated with locations on the 3D map in many embodiments. In some embodiments, flight location data can be received only at regular intervals (e.g., 30 seconds, 1 minute, 2 minutes, 5 minutes, 7 minutes, 10 minutes, etc.). In other embodiments, flight location data is received as frequently and continuously as the employed tracking technology allows. In still other embodiments, flight location data is received on demand, for example, after user input requesting updated flight location data.

In block S604, the method 600 includes identifying the target location with respect to the 3D map. In certain embodiments, this can include correlating a GPS coordinate or other indicator with a location on the 3D map.

In block S606, the method 600 includes generating at least one suggested exploration route based on exploration criteria. In many embodiments, the exploration criteria comprise at least one of a predicted scouting sensor detection improvement, a collision safety buffer, a total route distance or time, a maximum altitude, or a combination thereof. By analyzing at least one of these criteria, the method 600 can procedurally identify and generate possible maneuvers to nearby, accessible, and/or beneficial alternate or additional target locations that can assist a user of the system.

A predicted scouting sensor detection improvement, as an exploration criterion, seeks to improve the reliability or accuracy of measurements taken by one or more scouting sensors equipped on the UAV, in many embodiments. For example, a certain scouting sensor (e.g., a toxic gas sensor) may only take reliable measurements when within a certain distance of a feature of interest (e.g., a wildfire). Using a second scouting sensor, the system can detect that the UAV is not within the necessary distance of the feature of interest. Using a predicted scouting sensor detection improvement as an exploration criterion, the method 600 can generate at least one suggested exploration route that would maneuver the UAV closer to the feature of interest. In alternative embodiments, a suggested exploration route could maneuver the UAV farther away from or change its orientation to the feature of interest to take a more accurate measurement with a different scouting sensor.

A collision safety buffer, as an exploration criterion, seeks to maximize a UAV's proximity to the features of interest near the target location up to a predetermined safe distance in many embodiments. For example, the original target location can position the UAV substantially beyond a pre-determined collision safety buffer to the nearest obstacle (e.g., at about 20 m when the safety buffer is set to about 5 m.) Upon arrival, the UAV's position may prove to be too distant to be of optimal assistance. In these and similar embodiments, the method 600 can generate at least one exploration route that maneuvers the UAV closer to the limit of its collision safety buffer.

A total route distance or time, as an exploration criterion, seeks to reposition the UAV within a certain maximum distance or flight time that can offer alternative or superior vantage than the original target location in many embodiments. The term "total route distance" and "total route time" are intended to mean the distance or time required to maneuver the UAV from a starting position to the end point of the suggested exploration route. In certain embodiments, however, a suggested exploration route can be designed to loop back to its starting position. In these scenarios, the whole loop of the suggested exploration route can be considered the total route distance or time. In some embodiments, the total route distance, as an exploration criterion, can be from about 1 m to about 10 km. In some further embodiments, the total route distance can be from about 1 m to about 1000 m. In other embodiments, the total route distance can be from about 1 m to about 100 m. In still other embodiments, the total route distance can be from about 1 m to about 50 m. In further embodiments, the total route distance can be from about 1 m to about 25 m. In still further embodiments, the total route distance can be from about 1 m to about 10 m. In additional embodiments, the total route distance can be from about 100 m to about 250 m. In some embodiments, the total route time can be from about 1 second to about 12 hours. In some further embodiments, the total route time can be from about 1 second to about 1 hour. In other embodiments, the total route time can be from about 1 second to about 15 minutes. In still other embodiments, the total route time can be from about 1 second to about 7 minutes. In further embodiments, the total route time can be from about 30 seconds to about 5 minutes. In still further embodiments, the total route time can be from about 5 minutes to about 30 minutes. In many embodiments, a total route distance or time, as an exploration criterion, is determined according to the known capacities of the UAV being deployed. In various embodiments, the method 600 can generate at least one suggested exploration route that relocates the UAV to a position within a predetermined total route distance or time.

A maximum altitude, as an exploration criterion, seeks to elevate the UAV to a predetermined maximum altitude to achieve a potentially superior vantage over the target location, in many embodiments. In some situations, the original target location can be at an altitude lower than a maximally allowed altitude, and a better view might be achievable at a higher position. In many embodiments, a maximum altitude, as an exploration criterion, is determined according to the known capacities of the UAV being deployed. In these embodiments, the method 600 can generate at least one suggested exploration route having a higher altitude than the original target location but beneath a maximum altitude limit.

In order to avoid navigating the UAV into a known obstacle (e.g., a tree, a building, a hillside, etc.), the at least one suggested exploration route can be additionally generated according to the 3D map data and considering route constraint criteria, as discussed above in FIG. 3 in many embodiments. In certain embodiments, the route constraint criteria can include, but are not limited to, at least one of a collision safety buffer, a total route distance or time, a maximum altitude, at least one geofenced no-fly zone, a remaining battery life of the UAV, or a combination thereof.

In optional block S608, the method 600 can include assigning to at least one suggested exploration route a risk evaluation score according to exploration risk assessment criteria. In many embodiments, the exploration risk assessment criteria can include but are not limited to at least one of a minimum altitude change, a maximum altitude, a duration of travel time spent above a predetermined altitude threshold, collision risk indicators, weather risk indicators, environment risk indicators, or a combination thereof. In many embodiments, these exploration risk assessment criteria operate at least similarly to those of the route assessment criteria as discussed above for the method 400 of FIG. 4. As described herein, AI and/or ML techniques can be utilized in some embodiments to perform the analysis of the exploration risk assessment criteria to generate one or more suggested exploration routes. In some embodiments, the method 600 deletes or otherwise removes from consideration any suggested exploration routes that fail to score sufficiently favorably to meet a predetermined risk threshold. Furthermore, in some embodiments, the method 600 can additionally compare a plurality of suggested exploration routes and eliminate those which surpass a predetermined route similarity threshold to a better rated route. This prevents the consideration and subsequent presentation of a long list of nearly identical suggested exploration routes.

In block S610, the method 600 includes displaying the at least one suggested exploration route on a display of a user device that is in communication with the system. This notifies a user of what options are available for exploration routes. In some embodiments, the method 600 also displays each suggested exploration route along with its corresponding risk evaluation score if available. This can inform the user of which options pose a greater risk to the UAV than others. In some embodiments, the method 600 displays all generated suggested exploration routes. In other embodiments, the method 600 only displays those that surpassed a predetermined risk threshold as described above. In still further embodiments, the method 600 displays only a subset of the generated suggested exploratory routes.

In block S612, the method 600 includes receiving a selected exploration route from user input. In many embodiments, a user, interacting with a graphical user interface (GUI) or a user input element (e.g., button, slider, etc.) on a user device in communication the system, can input which of the at least one suggested exploration routes he or she would like the UAV to perform.

In block S614, the method 600 includes transmitting the selected exploration route to the UAV. In many embodiments, the corrected route is transmitted to the UAV in a manner that enables the UAV, utilizing its processor or microcontroller and memory, to activate its propulsion means in order to maneuver according to the selected exploration route. By various embodiments of the method 600, a UAV can be semi-autonomously dispatched along exploration routes procedurally generated by the system and/or method 600.

The methods described herein present their blocks in a particular order for ease of description only and should not have their sequence necessarily interpreted as limiting. One of skill in the art will appreciate that, in many embodiments, the methods herein can be performed in various sequences.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the UAV and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/ firmware combination can alternatively or additionally execute the instructions.

As used in the description and claims, the singular form "a", "an" and "the" include both singular and plural references unless the context clearly dictates otherwise. For example, the term "UAV" may include, and is contemplated to include a plurality of UAVs. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for dispatching and navigating an unmanned aerial vehicle (UAV) to a target location, the method comprising:

accessing a 3D map comprising LiDAR topographic map data or photogrammetric calculations aligned to global coordinates;

identifying a location of the UAV with respect to the 3D map via the global coordinates;

receiving an input comprising a target location;

determining the target location with respect to the 3D map;

generating at least one suggested exploration route between the location of the UAV to the target location utilizing the 3D map before being transmitted to the UAV, wherein the at least one suggested exploration route is based on at least one exploration criterion comprising at least one of: a predicted scouting sensor detection improvement, a collision safety buffer, a total route distance or time, a maximum altitude, or a combination thereof;

assigning to the at least one suggested exploration route, a risk evaluation score according to at least one exploration risk assessment criterion comprising at least one of: a minimum altitude change, a maximum altitude, a duration of travel time spent above a predetermined altitude threshold, collision risk indicators, weather risk indicators, environment risk indicators, or a combination thereof;

determining whether the at least one suggested exploration route meets or exceeds a predetermined risk evaluation score threshold and based on an urgency override input;

when the at least one suggested exploration route meets or exceeds the predetermined risk evaluation score threshold and based on the urgency override input, transmitting the at least one suggested exploration route to the UAV to cause automatic dispatch of the UAV to the target location via the at least one suggested exploration route; and when the urgency override input is received, selecting a potential route having an inferior evaluation score to a risk evaluation score of the at least one suggested exploration route, and transmitting the potential route to the UAV to cause automatic dispatch of the UAV to the target location via the potential route with the inferior evaluation score.

2. The computer-implemented method of claim 1, further comprising receiving sensor data from at least one scouting sensor coupled to the UAV; and transmitting at least a portion of the sensor data to a user device.

3. The computer-implemented method of claim 2, wherein the at least one scouting sensor is selected from the group consisting of a camera, an infrared camera, an image sensor, a microphone, an acoustic sensor, a LiDAR sensor, an ultrasonic sensor, a sonar sensor, a radar sensor, a gyroscope sensor, an electrochemical toxic gas sensor, a temperature sensor, a humidity sensor, a proximity sensor, a barometric air pressure sensor, a radiation sensor, or a combination thereof.

4. The computer-implemented method of claim 1, wherein the method is performed by a navigation module.

5. The computer-implemented method of claim 4, wherein the navigation module is physically attached to the UAV.

6. The computer-implemented method of claim 4, wherein the navigation module is electronically integrated into and in electrical communication with the UAV.

7. The computer-implemented method of claim 4, wherein the navigation module is one or more computing devices on a cloud network system.

8. The computer-implemented method of claim 4, wherein the navigation module is a virtual machine.

9. The computer-implemented method of claim 4, wherein the navigation module is a user device communicatively coupled to the UAV.

10. The computer-implemented method of claim 4, further comprising receiving at least one of: updated 3D map data, updated geofenced no-fly zones, updated drop-off or landing zones, updated collision risk indicators, updated weather risk indicators, or updated environment risk indicators; and updating, in the 3D map, one or more zone indicator tags based on the at least one of: the updated 3D map data, the updated geofenced no-fly zones, the updated drop-off or landing zones, the updated collision risk indicators, the updated weather risk indicators, and the updated environment risk indicators.

11. The computer-implemented method of claim 4, further comprising receiving the input from a computer-aided dispatch (CAD) system in communication with the navigation module.

12. A system for dispatching and navigating an unmanned aerial vehicle (UAV) to a target location comprising:
 a navigation module in communication with a UAV, the navigation module comprising:
  a processor; and
  a memory storing a 3D map comprising the target location and machine-readable instructions such that, when executed by the processor, cause the processor to perform a method comprising:
   determining a location of the UAV with respect to the 3D map, wherein the 3D map comprises LiDAR topographic map data or photogrammetric calculations aligned to global coordinates;
   receiving an input indicating a target location;
   determining the target location with respect to the 3D map;

generating at least one suggested exploration route between the location of the UAV to the target location utilizing the 3D map before being transmitted to the UAV, wherein the at least one suggested exploration route is based on at least one exploration criterion comprising at least one of: a predicted scouting sensor detection improvement, a collision safety buffer, a total route distance or time, a maximum altitude, or a combination thereof;
   assigning to the at least one suggested exploration route a risk evaluation score according to at least one exploration risk assessment criterion comprising at least one of: a minimum altitude change, a maximum altitude, a duration of travel time spent above a predetermined altitude threshold, collision risk indicators, weather risk indicators, environment risk indicators, or a combination thereof;
   determining whether the at least one suggested exploration route meets or exceeds a predetermined risk evaluation score threshold and based on an urgency override input, the urgency override input changes a selection of the at least one suggested exploration route to a selected route with a risk evaluation score that is inferior to one or more other routes of the at least one suggested exploration route;
   when the at least one suggested exploration route meets or exceeds the predetermined risk evaluation score threshold and based on the urgency override input, cause automatic dispatch of the UAV to the target location via the at least one suggested exploration route; and
   when the urgency override input is received, selecting a potential route having an inferior evaluation score to a risk evaluation score of the at least one suggested exploration route, and causing automatic dispatch of the UAV to the target location via the potential route with the inferior evaluation score by ignoring the environment risk indicators.

13. The system of claim 12, further comprising the UAV and a user device in communication with the navigation module and the UAV.

14. The system of claim 13, wherein the user device transmits the input to the navigation module after receiving a user input at the user device.

15. The system of claim 12, further comprising the UAV, wherein the UAV comprises at least one scouting sensor, wherein the machine-readable instructions stored on the memory further instruct the processor to: cause the UAV to obtain sensor data from the at least one scouting sensor; and cause the UAV to transmit the obtained sensor data to a user device.

16. The system of claim 15, wherein the at least one scouting sensor is selected from the group consisting of a camera, an infrared camera, an image sensor, a microphone, an acoustic sensor, a LiDAR sensor, an ultrasonic sensor, a sonar sensor, a radar sensor, a gyroscope sensor, an electrochemical toxic gas sensor, a temperature sensor, a humidity sensor, a proximity sensor, a barometric air pressure sensor, a radiation sensor, or a combination thereof.

17. The system of claim 12, further comprising the UAV, wherein the navigation module is physically attached to the UAV.

18. The system of claim 12, further comprising the UAV, wherein the navigation module is electronically integrated into and in electrical communication with the UAV.

19. The system of claim 12, wherein the navigation module is one or more computing devices on a cloud network system.

20. The system of claim 12, wherein the machine-readable instructions stored on the navigation module further instruct the processor to: receive at least one of: updated 3D map data, updated geofenced no-fly zones, updated drop-off or landing zones, updated collision risk indicators, updated weather risk indicators, or updated environment risk indicators; and updating, in the 3D map, one or more zone indicator tags, based on the at least one of: the updated 3D map data, the updated geofenced no-fly zones, the updated drop-off or landing zones, the updated collision risk indicators, the updated weather risk indicators, and the updated environment risk indicators.

\* \* \* \* \*